United States Patent [19]

Tatchyn

[11] Patent Number: 4,481,653
[45] Date of Patent: Nov. 6, 1984

[54] TUNABLE X-RAY MONOCHROMATOR USING TRANSMISSION GRATINGS

[75] Inventor: Roman O. Tatchyn, Palo Alto, Calif.

[73] Assignee: The Board of Trustees of the Leland Stanford Junior University, Palo Alto, Calif.

[21] Appl. No.: 407,287

[22] Filed: Aug. 11, 1982

[51] Int. Cl.³ .......................................... G01N 23/20
[52] U.S. Cl. ..................................................... 378/85
[58] Field of Search ............................... 356/331–334; 378/84, 85

[56] References Cited
U.S. PATENT DOCUMENTS
3,664,742  5/1972  Witte et al. ...................... 356/332

FOREIGN PATENT DOCUMENTS
374429  6/1932  United Kingdom ............... 356/333

Primary Examiner—F. L. Evans
Attorney, Agent, or Firm—Flehr, Hohbach, Test, Albritton & Herbert

[57] ABSTRACT

A tunable monochromator includes an input transmission grating and an output transmission grating with intermediate deflectors for deflecting first order of radiation from the input grating to the output grating. The intermediate deflectors are mechanically coupled to the input and output gratings whereby the monochromator can be tuned. In a preferred embodiment the intermediate reflector may comprise one or more mirrors or one or more intermediate gratings. The monochromator is particularly useful with soft X-ray radiation from a ring synchrotron.

7 Claims, 24 Drawing Figures

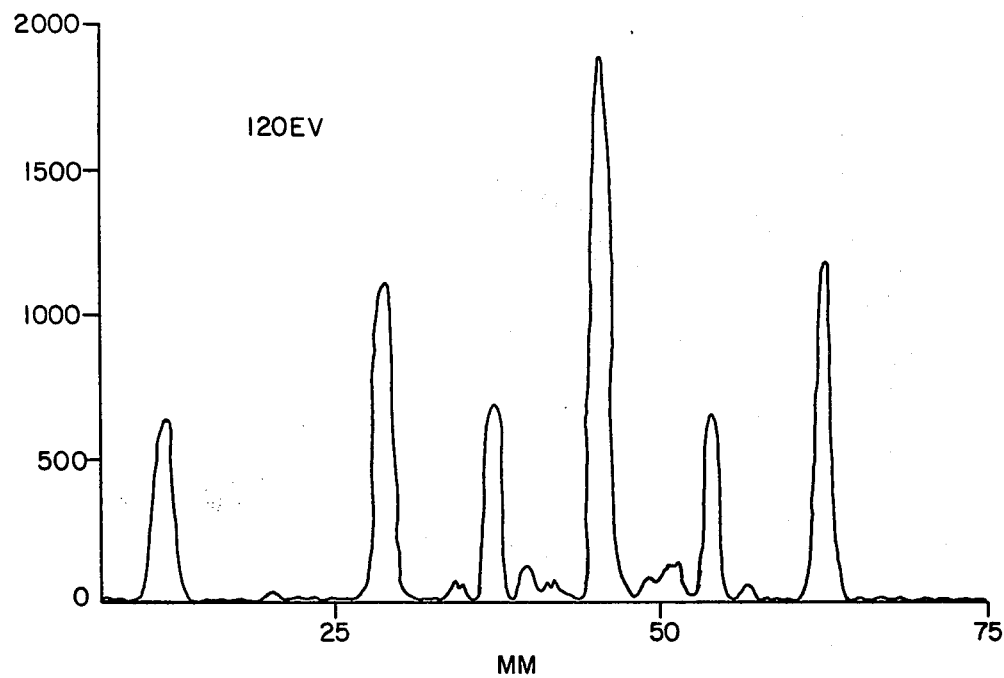
FIG.—1
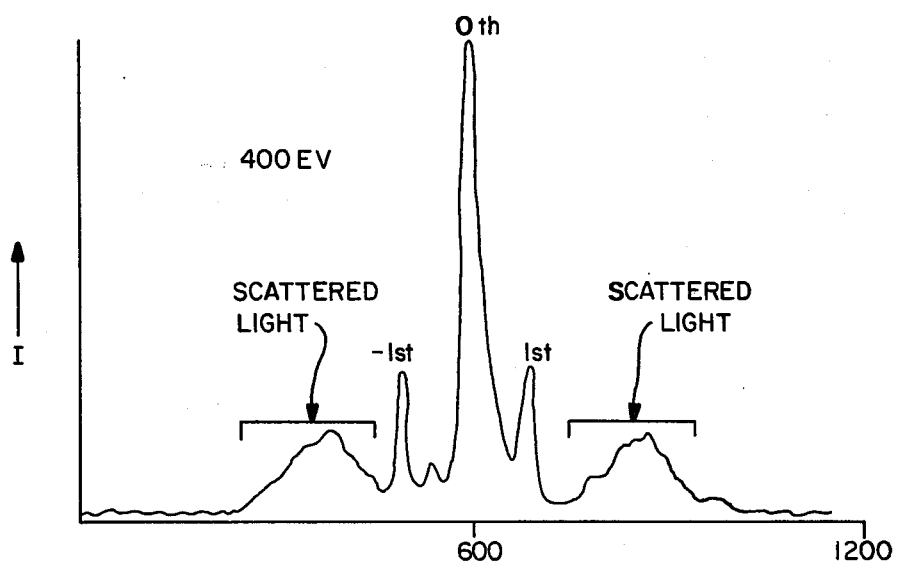
FIG.—2

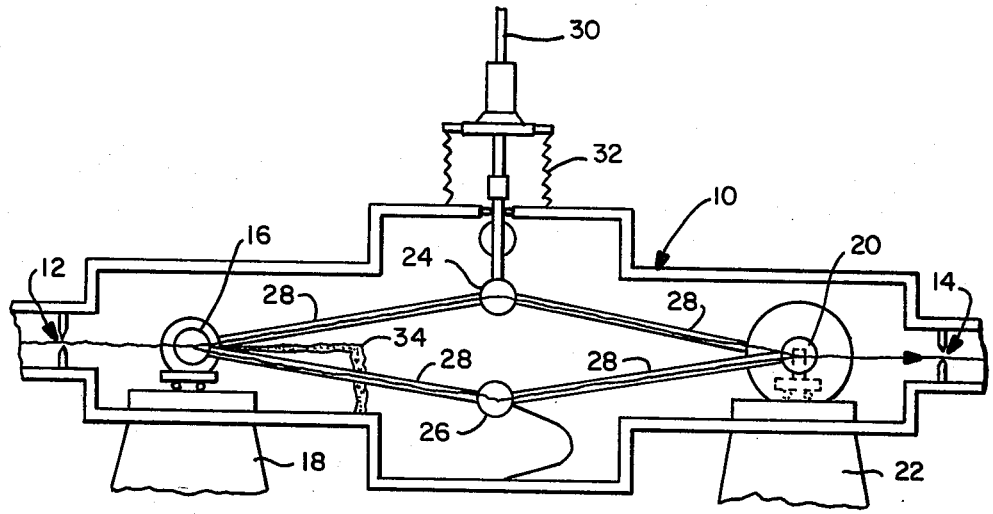
FIG.—3A
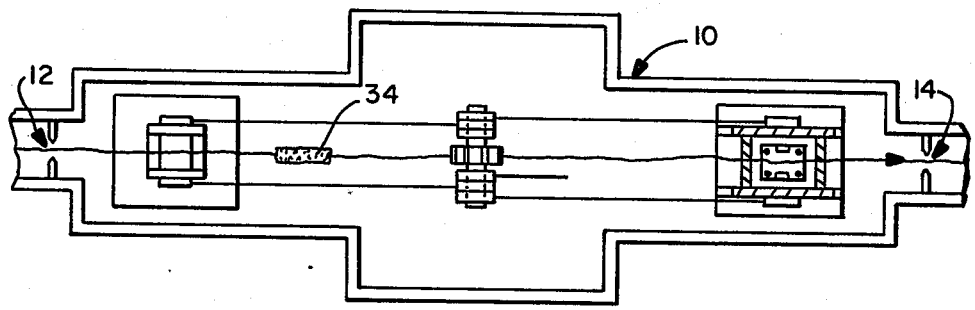
FIG.—3B
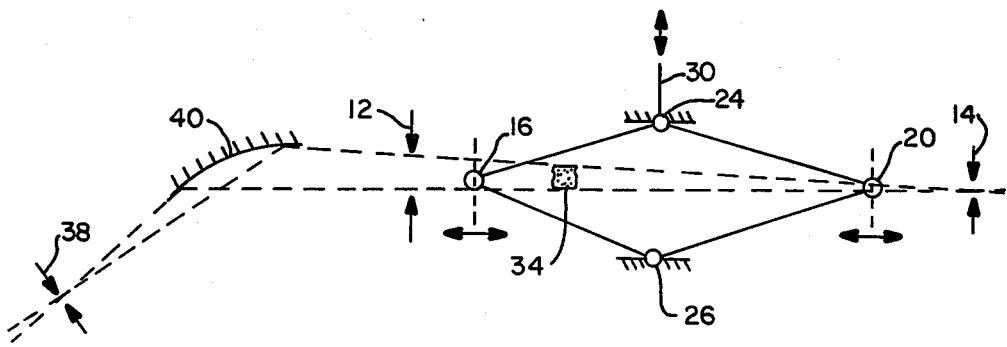
FIG.—4

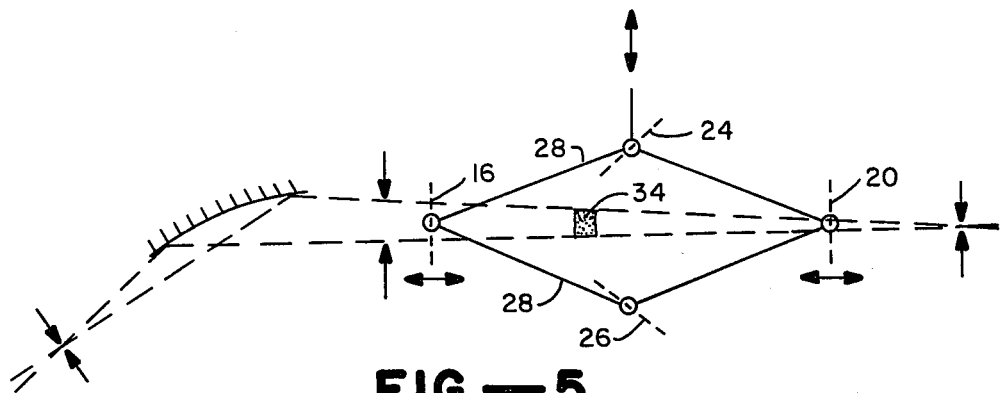
FIG.—5
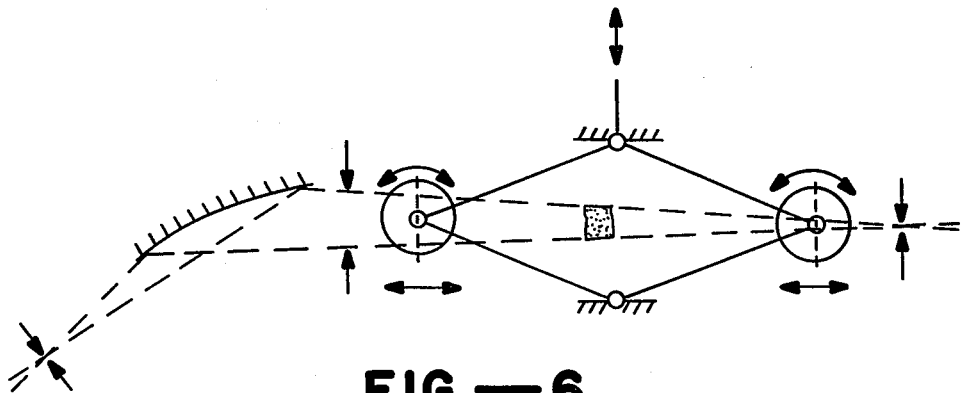
FIG.—6
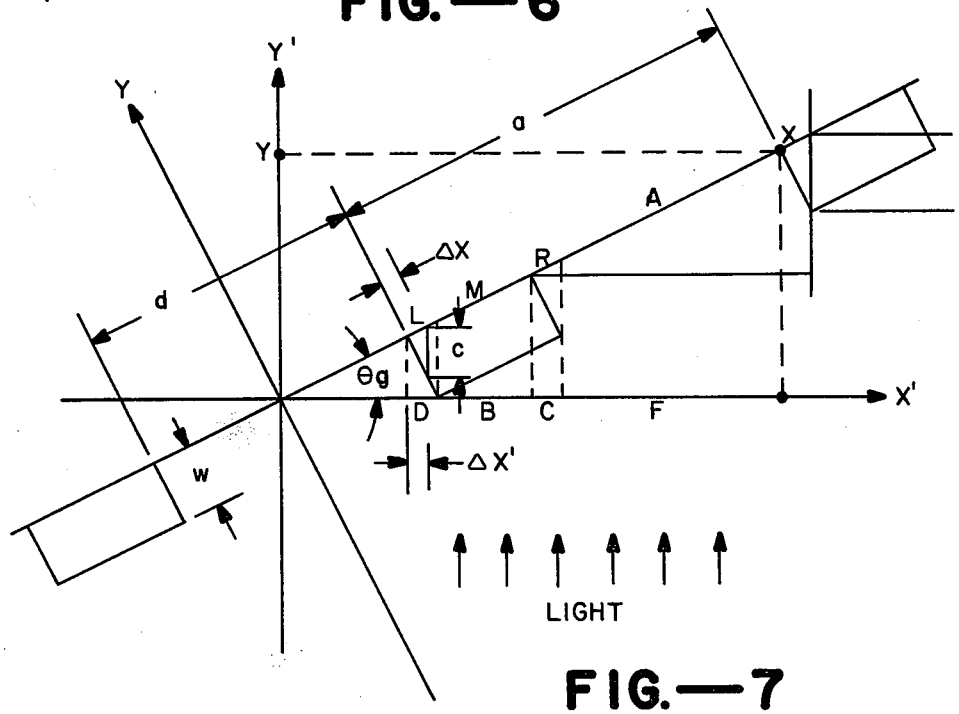
FIG.—7

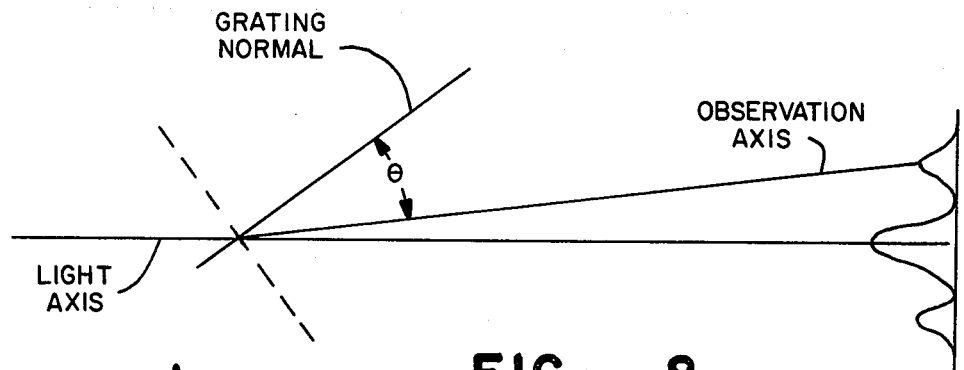
FIG.—8
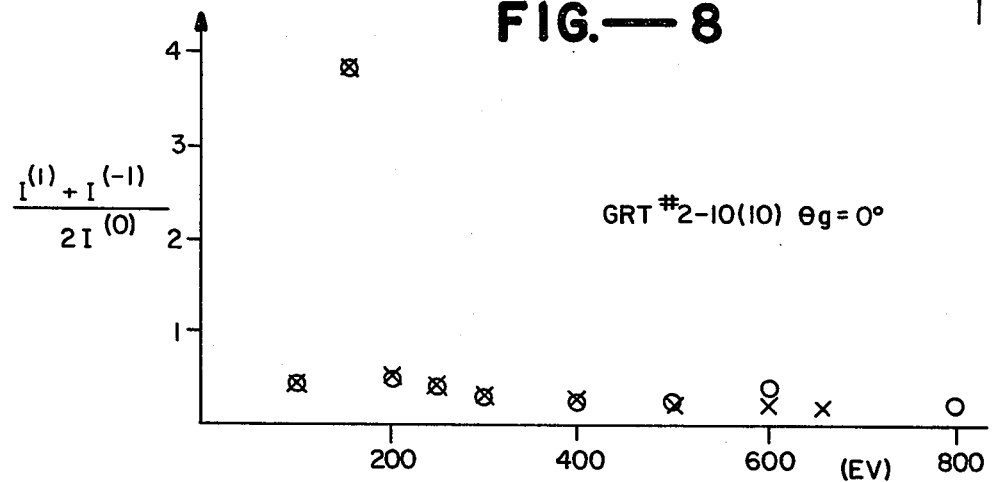
FIG.—9A
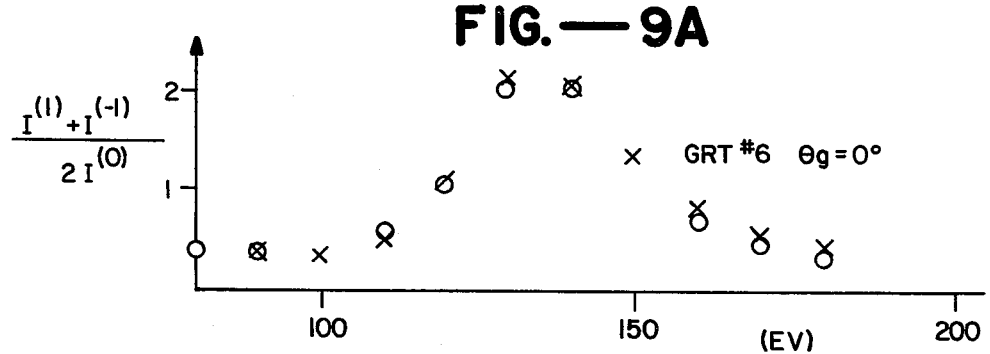
FIG.—9B
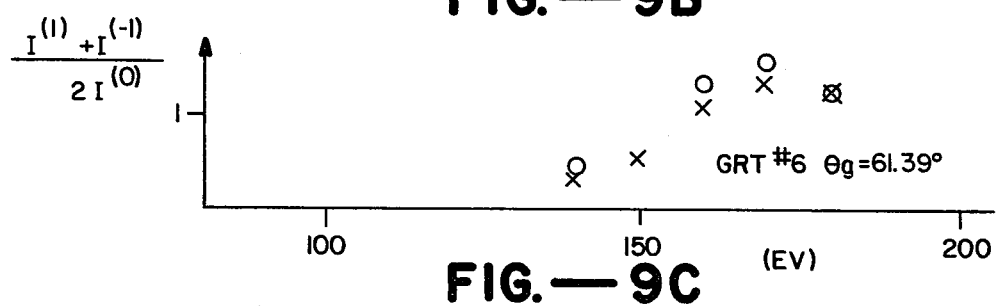
FIG.—9C

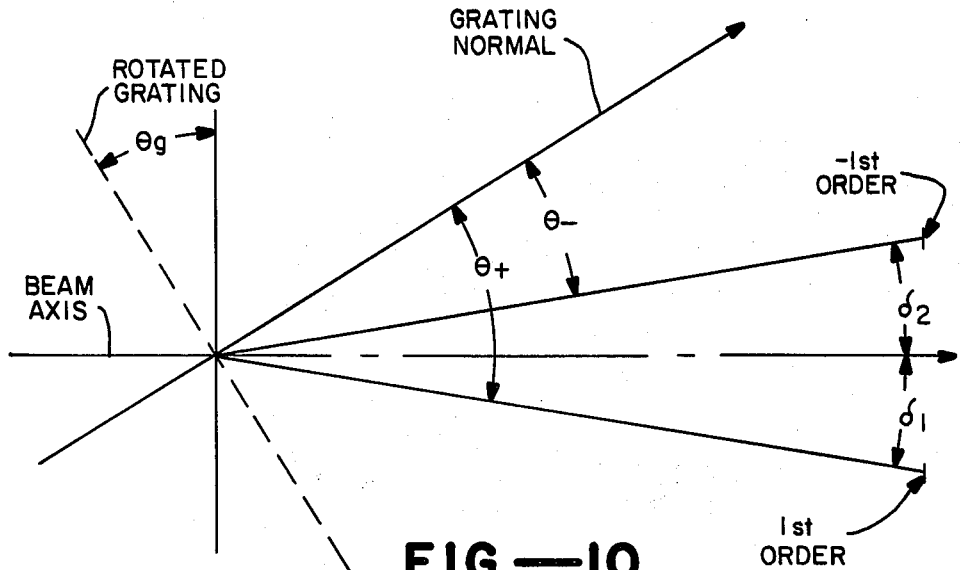
FIG.—10
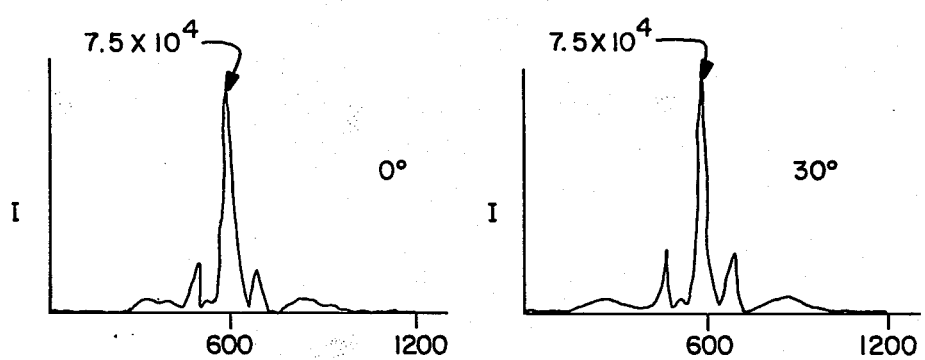
FIG.—11A FIG.—11B
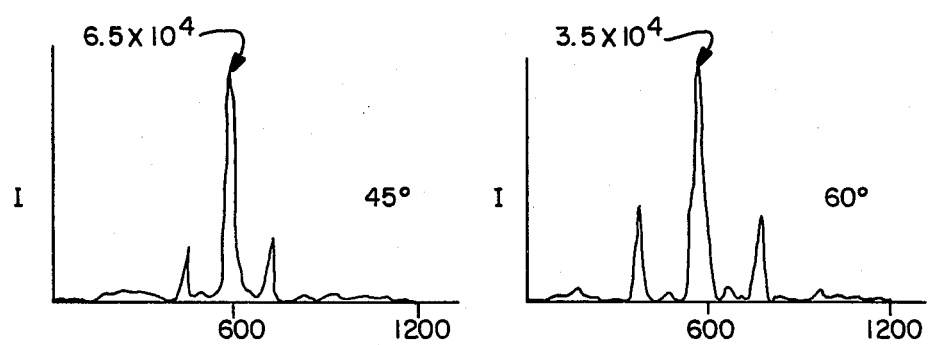
FIG.—11C FIG.—11D

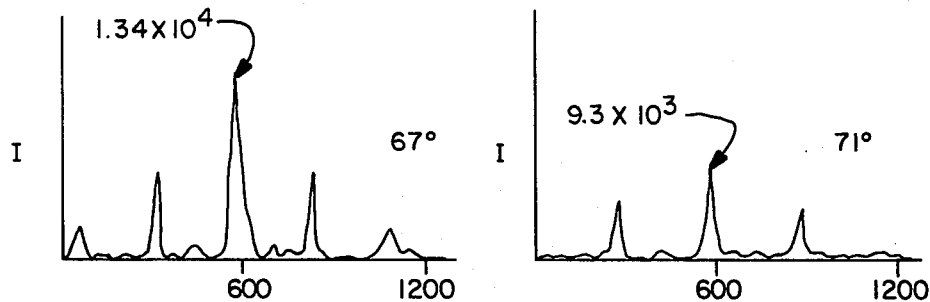
FIG.—11E    FIG.—11F
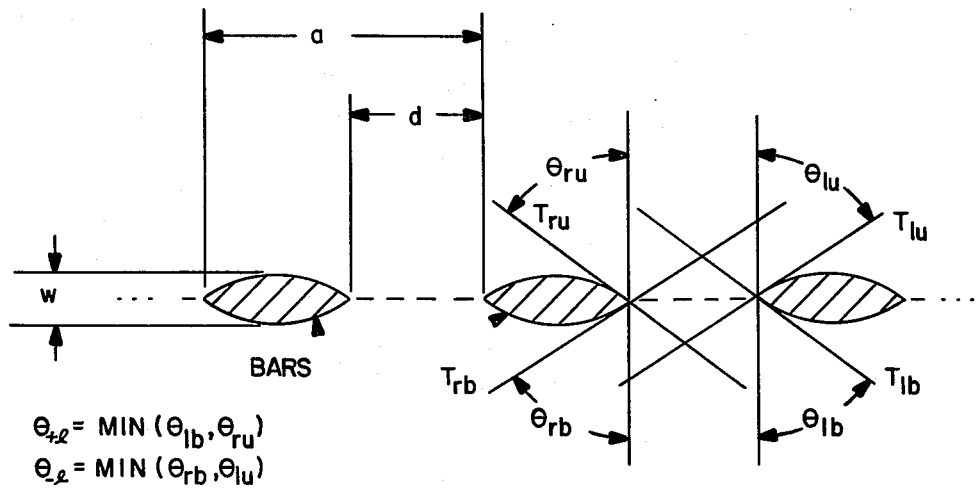
$\Theta_{rl} = \text{MIN}(\Theta_{lb}, \Theta_{ru})$
$\Theta_{l} = \text{MIN}(\Theta_{rb}, \Theta_{lu})$
FIG.—12
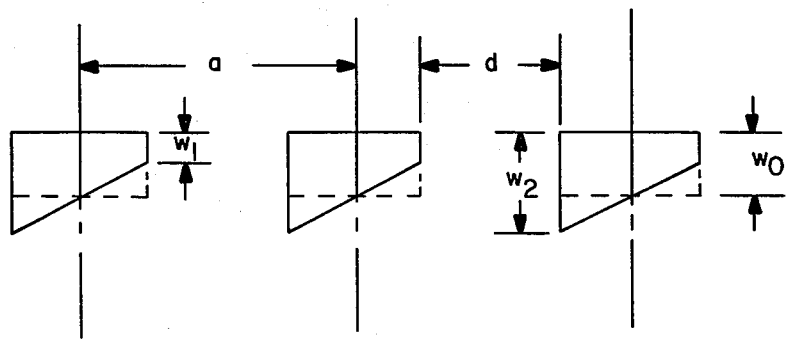
FIG.—13

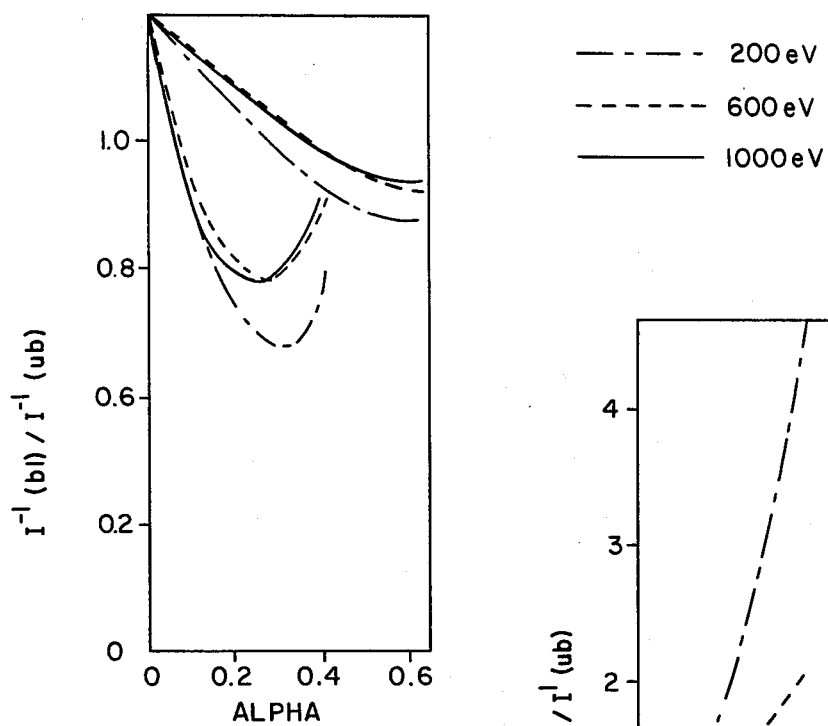
FIG.—14A
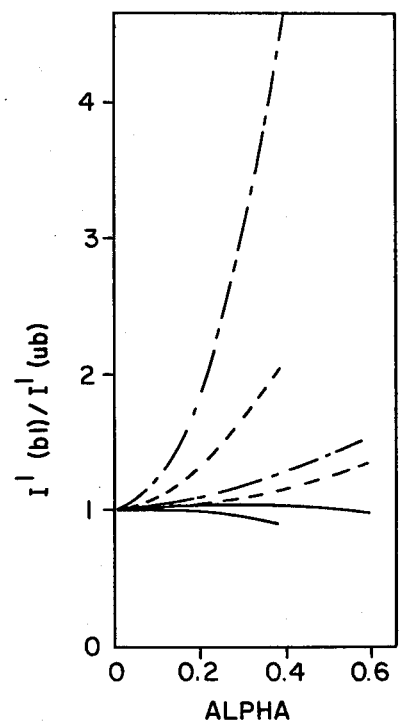
FIG.—14B
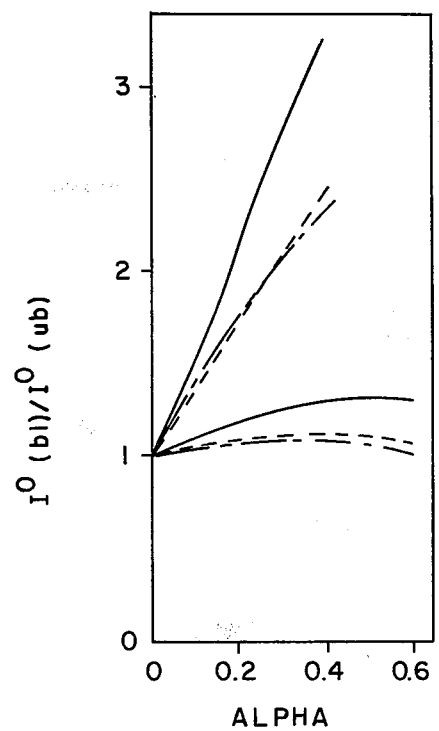
FIG.—14C

TUNABLE X-RAY MONOCHROMATOR USING TRANSMISSION GRATINGS

This invention was made with Government support under National Science Foundation Contract No. DMR77-27489. The Government has certain rights in this invention.

This invention relates generally to monochromators, and more particularly the invention is directed to a monochromator employing transmission gratings.

The use of combined focusing and diffracting reflection gratings is known in monochromators for soft X-rays (e.g. 100-1,000 angstrom wavelengths) as produced in synchrotrons. Such monochromators typically possess a single degree of freedom for tuning purposes and are specifically limited by the combined focusing and diffraction design. The optical design must be rigidly fixed to the specific shape of the grating surface, and any changes to the optical parameters must be accomplished with an ancillary optical system, thereby lowering throughput. Further, the high quality focusing/diffracting reflection gratings are very expensive. Additionally, the grating is shaped like a natural reflector which tends to pass along broad bands of reflected light, especially at broadband source installations such as synchrotron rings.

Accordingly, an object of the present invention is an improved monochromator.

Another object of the invention is a tunable monochromator for soft X-ray radiation.

A further object of the invention is a monochromator having increased first order throughput.

Yet another object of the invention is a tunable monochromator which is relatively simple in design and inexpensive.

A feature of the invention is the use of transmission gratings in diffracting radiation.

Briefly, a monochromator in accordance with the invention includes an input grating for receiving radiation which preferably has a sufficient beam spot size to illuminate most of the bars of the grating. Beam stop means is provided to intercept unwanted radiation energy at the incoming beam angle, and one or more beam deflection means is provided for receiving the desired first orders of radiation at the angles between the incoming beam angle and the first order of radiation. An output grating receives the reflected or diffracted first orders of radiation and transmits the combined first orders of radiation.

In accordance with one feature of the invention the input and output gratings and the beam deflection means are mechanically coupled whereby the monochromator can be easily tuned. The input and output gratings are linearly moved away from each other as the deflection means are linearly moved towards each other, and conversely the input and output gratings are linearly moved towards each other as the deflection means are linearly moved away from each other.

In accordance with another feature of the invention, the input and output gratings may be curved to provide focusing properties, thereby avoiding the necessity for a preliminary independent focusing mirror.

In one embodiment, the deflection means comprises mirrors which are positioned to reflect the first orders of radiation from the input grating to the output grating. In a one degree of freedom design, the input and output gratings are fixed perpendicular to the input and output radiation. Alternatively, a three degree of freedom design includes rotatable input and output gratings. This configuration uses a single deflecting mirror and maximizes throughput at each frequency.

In another embodiment, the input and output gratings are fixed perpendicular to the input and output radiation, and the deflection means comprises first and second intermediate gratings for ultra-high harmonic suppression.

The invention and objects and features thereof will be more readily apparent from the following description and appended claims when taken with the drawings, in which:

FIG. 1 and FIG. 2 are graphs illustrating the spectra of radiation out of conventional monochromators which have been diffracted through typical gold transmission gratings.

FIGS. 3A and 3B are a side view in section and a top view in section of a monochromator in accordance with the present invention.

FIG. 4 is a schematic illustrating the operation of a monochromator in accordance with one embodiment of the invention.

FIG. 5 is a schematic illustrating the operation of a monochromator in accordance with another embodiment of the invention.

FIG. 6 is a schematic illustrating operation of a monochromator in accordance with another embodiment of the invention.

FIG. 7 is a schematic of a tilted rectangular transmission grating illustrating design parameters.

FIG. 8 is a schematic of the principal spectral observation parameters of a tilted grating.

FIGS. 9A-9C illustrate a comparison of computed and measured spectral order intensities for two gratings at various angles and energies.

FIG. 10 is a schematic of various spectral observation parameters of a tilted grating.

FIGS. 11A-11F illustrate a sequence of spectra taken at various angles of a single grating.

FIG. 12 is a schematic of various parameters of a grating with bars of a general shape.

FIG. 13 is a schematic of a canonical blazing scheme imposed on an ideal rectangular grating.

FIGS. 14A-14C are computed generated outputs showing the relative ratios between the zero order and first orders of a blazed vs. an unblazed grating for various values of tilt at three broadly separated energies.

The use of monochromators to filter radiation as generated by a synchrotron is known in the art. The monochromators are placed in a beam of radiation and diffract the radiation in various orders of energy at angles dependent on the radiation frequency. Thus, radiation at a given frequency can be obtained by intercepting the diffracted first order thereof.

A conventional grasshopper monochromator is disclosed by Brown, Bachrach, and Lien, "Nuclear Instrumentation and Methods", 152, 1978, pg. 73 which employs reflection gratings. FIGS. 1 and 2 are plots of the spectra of the outputs of such monochromators at different energies. In FIG. 1 a considerable harmonic presence is seen from using the grasshopper monochromator, and FIG. 2 shows the large scattered light component in the output of a grasshopper monochromator.

Such monochromators experience a considerable output loss (e.g. 280 eV) and the monochromators require refocusing mirrors to tailor the focal properties of the beams suitably for various experimental purposes.

In accordance with the present invention a monochromator is provided which employs transmission gratings rather than reflection gratings. It is known that transmission gratings have many inherent advantages over reflection gratings including higher throughout into the first order of diffraction radiation. The throughout may vary from 10% to as much as 50% for transmission gratings using blazed bars, as will be described hereinbelow. Further, since the transmission grating passes a large fraction of incident light a much lower sensitivity to carbon pollution is experienced. Further, planar diffraction transmission gratings are less expensive to fabricate than are reflection type concave gratings.

Referring now to FIGS. 3A and 3B, a side view in section and a top view in section of a monochromator in accordance with the present invention is illustrated. The monochromator is housed inside of a container shown generally at 10 which has a slit 12 at the input for receiving radiation and an output having a slit 14 for passing the filtered radiation. A first transmission grating 16 is linearly moveably mounted on a pedestal 18 within the housing 10 and an output grating 20 is linearly moveably mounted on a second pedestal 22 near the output slit 14. Intermediate the input grating 16 and output grating 20 are first and second reflecting means 24 and 26 with the reflecting means 24 and 26 being mechanically coupled to the input grating 16 and output grating 20 by pivotally attached members 28. The deflecting means 24 may be mirrors or gratings, as will be described further hereinbelow.

Rotatably coupled to deflecting means 24 and the top members 28 is a motor driven rod 30 which extends into housing 10 through a bellows 32. As the plunger 30 is inserted into housing 10 the deflecting means 24 and 26 move towards each other and the input grating 16 and output grating 20 linearly move away from each other. Conversely, extraction of rod 30 from housing 10 moves the deflector 24 and deflector 26 away from each other and the input gratings 16 and the output grating 20 linearly move towards each other. By so moving rod 30 the monochromator can be tuned over approximately one decade of frequency. A beam stop 34 is provided to intercept the zero order or undeflected input beam.

FIG. 4 is a schematic of one embodiment of the monochromator of FIG. 3 illustrating a one degree of freedom, fixed entrance and fixed exit mirror tuned embodiment with separate focusing and diffracting transmission grating. Input radiation from a synchrotron is directed through a first slit 38 to a focusing mirror 40 and then through the input slit 12 and the input grating 16. The beam stop 34 intercepts the zero order of the diffracted light, and the first order of diffracted light is intercepted by mirrors 24 and 26 and thence pass to the output grating 20 where the first order of radiation is recombined and passes through the output slit 14. Tuning of the monochromator is effected by movement of the plunger 30. The mirrors reflect the desired first orders (plus some harmonics) onto the vertical second grating, which then disburses the light in such a way that two of the first orders are combined almost coaxially with the axis of incoming light and emerges from the output slit. The design is symmetrical and the only effect of not utilizing either mirror would be to halve the output power. If one of the mirrors is not used, the resolution of the monochromator can be scaled directly by tilting both the input grating and the output grating to the appropriate angles. With the input and output gratings mounted at fixed angles it is possible to make the support for the input grating rigid and thereby maximize its ability to dissipate heat. In this embodiment using only two gratings, the throughput of energy is maximized and the two mirrors act as low pass filters in conjunction with the gratings to thereby minimize the harmonic content of the output radiation.

Referring to FIG. 5, a three grating, one degree of freedom configuration, monochromator in accordance with another embodiment of the invention is illustrated. In this embodiment the deflectors 24 and 26 are gratings and by setting these gratings at an angle of approximately 30° with respect to the arms 28 joining the input 16, the gratings will always disperse the desired first orders onto the output grating 20. While this configuration provides lower throughput, superior resolution and harmonic suppression over the range of the monochromator operation is realized.

FIG. 6 is a schematic of a two grating, three degree of freedom configuration of a monochromator. The deflectors in this embodiment are mirrors, however only one of the mirrors can be employed. The advantage of this embodiment is the maximization of throughput at the operating frequency.

In each of the embodiments of FIGS. 4–6 the monochromator is accommodated within a single mechanical unit in which tuning of transmission grating in the X-ray range is accomplished by movement of the plunger alone or in conjunction with rotation of the input and output gratings. At least one order of magnitude improvement in throughput, revolution, reduced scattered light, reduced sensitivity to carbon pollution, and reduced harmonic content is realizable with each of these configurations, as compared with the convention grasshopper monochromator. The monochromator in accordance with the invention has improved throughput and resolution, reduced scattered light, reduced sensitivity to carbon pollution, and reduced harmonic content.

Consideration will now be given to the diffraction properties of transmission gratings. The diffraction properties of transmission gratings have been analyzed, modeled and verified experimentally by inventor over the last several years. The general model for the rotated grating is shown in FIG. 7. The bars are shown to be rectangular, but the analytical expression for the far-field intensity spectrum is completely general, with different bar shapes being completely subsumed under the expression $\overline{M}$, $\overline{R}$, and $\overline{I}$.

In the following description the definitions below are employed:
$\hat{n} = n + ik = (1-\delta) + ik \equiv$ complex index of refraction
$a \equiv$ grating period in units of wavelength
$d \equiv$ aperture spacing in units of wavelength
$W \equiv$ grating bar thickness in wavelength units
$s \equiv$ sine of the observation angle with respect to the grating normal. At the various orders m, $s = m/a$, where $m = 0, \pm 1, 2, \ldots$
$\lambda \equiv$ light wavelength
$N' \equiv$ number of illuminated bars
$\theta_g \equiv$ angle of tilted grating with respect to its normal (perpendicular) position with respect to the light
$\overline{A} \equiv$ Fourier transform of the open-aperture field distribution across the top of the grating surface (section A in FIG. 7)
$\overline{M} \equiv$ Fourier transform of the field distribution across the "center" part of a top bar surface (section M in FIG. 7)

$\overline{R}$ ≡ Fourier transform of the field distribution across the "right" part of a top bar surface (section R in FIG. 7)

$\overline{L}$ ≡ Fourier transform of the field distribution across the "left" part of a top bar surface (section L in FIG. 7)

$s' = s - \sin\theta_g$ ≡ the "shifted" variable of a tilted grating $\delta_1$ ≡ angle between the 0th and 1st orders of a tilted grating (see FIG. 10)

$\delta_2$ ≡ angle between the 0th and −1st orders of a tilted grating (see FIG. 10)

$\theta_+$ ≡ angle between the grating normal and the 1st order of a tilted grating (see FIG. 10)

$\theta_-$ ≡ angle between the grating normal and the −1st order of a tilted grating (see FIG. 10)

FIG. 7 illustrates that tilting the grating introduces a uniform phase shift $$|\Delta\phi| = 2\pi(\sin\theta_g)(\chi/\lambda) \tag{1}$$

across the top grating surface (the $\chi$ axis).

Using the Fourier shift theorem, the expression for the farfield intensity of the tilted grating as (for an incoming beam of intensity $I_0$) is:

$$\frac{I(s')}{I_0\cos\theta_g} = \beta_2(s',\theta_g)[|\overline{L}\ e^{-2\pi i s'(a-d+W\tan\theta_g)/2} + \overline{R}\ e^{2\pi i s'(a-d+W\tan\theta_g)/2} + \overline{M} + e^{-i\pi s'a}\overline{A}|]^2 \tag{2}$$

where vacuum-interface reflection effects have been ignored and refraction effects in the bars have been neglected.

The variable $s'$ in Equation (2) is equal to $$s' = s - \sin\theta_g \tag{3}$$

$$s' = \sin\theta - \sin\theta_g \tag{4}$$

wherein $\theta$ is the observation angle with respect to the grating normal (see FIG. 8).

If refraction and reflection effects are taken into account, and if they are assumed small (a valid assumption in the soft X-ray range for most materials) then Equation (2) is simply modified to:

$$\frac{I(s')}{I_0\cos\theta_g} \cong \beta_2(s',\theta_g)[|\overline{L}'\ e^{i\phi L}\ e^{-2\pi i s'((a-d+W\tan\theta_g)/2)} + \overline{R}'\ e^{i\phi R}\ e^{2\pi i s'((a-d+W\tan\theta_g)/2)} + \overline{M}' + e^{-i\pi s'a}\overline{A}'|]^2 \tag{5}$$

Equation (5) has been run on a computer and its results compared to experimental data taken with several gold gratings with roughly rectangular bars (e.g., bars for which $W<<(a-d)$ was approximately true), and the agreement between the model and the experiment was found to be excellent (see FIGS. 9A-9C). Thus, the monochromator design can be based on the behavior of the model equation given above.

The following important optical effects should be considered in designing a transmission grating monochromator for the soft X-ray range:
 (a) The Interference Effect
 (b) The Asymmetric Spectrum
 (c) The Occlusion Effect
 (d) Blazing The Interference effect.

If the easily derived expressions for $\overline{L}$, $\overline{R}$, and $\overline{M}$ for a *rectangular* grating are substituted into Equation (2), the following approximate expression is obtained for the *ratios* of the mth diffracted order to the 0th order (for $W<<(a-d)$):

$$f\left(m,\frac{a}{d},\lambda,\theta_g\right) \cong [1 - e^{-2\pi W'k(\lambda)}\cos 2\pi W'\delta(\lambda) + e^{-4\pi W'k(\lambda)}]$$

$$\sinc^2\left(\frac{md'}{a}\right)\left[1 + 2\left(\frac{a}{d'} - 1\right)e^{-2\pi W'k(\lambda)}\right.$$

$$\left.\cos 2\pi W'\delta(\lambda) + \left(\frac{a}{d'} - 1\right)^2 e^{-4\pi W'k(\lambda)}\right] \tag{6}$$

where $W' = W\sec\theta_g$ \quad (7)
and $d' = d - W\tan\theta_g$ \quad (8)
The expression will be exact at $\theta_g = 0°$.

Equation (6) is a convenient formula for estimating how the ratio of the first order to the zeroth order intensities for various parameters like grating thickness W, bar/aperture ratio $(a-d)/d$, and also for various frequencies of the light for which the optical constants of the material, $\delta$ and $k$, assume different values. In fact, given a list of materials with their tabulated optical constants, one can then select optimum thicknesses and bar/aperture ratios which will maximize the first-order power at the desired frequency of interest or over some frequency range of interest as the grating rotates. It should be pointed out that the formula (6) holds only for the case of rectangular bars of large aspect ratio $(W<<(a-d))$ and that different bar shapes may yield more optimum efficiencies into 1st order.

The Asymmetric Spectrum.

To design a monochromator, it is evidently desirable to know where the diffracted beams will emerge. The principal peaks of the diffracted spectrum based on Equation (2), will obviously occur where $$s' = m/a \tag{9}$$

or $$\sin\theta_g = m/a \tag{10}$$

or, looking at FIG. 10, $$\pm\frac{m}{a} = \sin\theta_\pm - \sin\theta_g \tag{11}$$

$$\frac{m}{a} = \sin(\theta_g + \delta_1) - \sin\theta_g \tag{12}$$

$$-\frac{m}{a} = \sin(\theta_g - \delta_2) - \sin\theta_g \tag{13}$$

Obviously, $$\delta_1 = \sin^{-1}\left[\frac{m}{a} + \sin\theta_g\right] - \theta_g \tag{14}$$

$$\delta_2 = -\sin^{-1}\left[\frac{m}{a} + \sin\theta_g\right] + \theta_g \tag{15}$$

and, for small dispersions, and $\theta_g \lesssim 60°$, $$\delta_1 \cong \frac{m}{a} \sec\theta_g + \frac{\tan\theta_2}{2}\left(\frac{m}{a}\sec\theta_g\right)^2 \quad (16)$$

$$\delta_2 \cong \frac{m}{a} \sec\theta_g - \frac{\tan\theta_g}{2}\left(\frac{m}{a}\sec\theta_g\right)^2 \quad (17)$$

It is clear that the precise deviation angles are to be derived from Equations (14) and (15).

Given small dispersion, however, Equations (16) and (17) predict that for the deviation angles to be increased by a factor of two, the grating has to be rotated by approximately 60°.

The Occlusion Effect.

This effect arises from the fact that the bars have a finite thickness (see FIG. 7). As the grating rotates, the open apertures facing the light inevitably shrink. It this occurs in a region where the bars become effectively opaque, then all the low-numbered orders will start coming in at almost equal strength as the grating rotates, and the net effect will be to diminish the power into either first order tremendously in the limit. This means that designing a monochromator that is to be tuned by rotation should be carefully considered, as *large* rotation (for a large tuning range) will be at a tradeoff with small rotation to (minimize) the occlusion effect). FIGS. 11A-11F show the inevitable occlusion effect coming in for a grating with thin bars. As is seen, the *thinner* the bars with respect to their width, the less severe is the occlusion effect at small angles.

It is also clear that the *rectangular* bar shape is the worst one, since the bars will start blocking the aperture at any small angle of rotation other than 0°. FIG. 12 shows that for a suitable non-rectangular shape, the occlusion effect could be eliminated (a minimized) over a suitable range of rotation. Thus, the tradeoff here would be between how much one gains from eliminating the occlusion effect and how much one loses in first-order efficiency from the different interference effect caused by the new bar shapes.

Blazed Transmission Gratings.

Blazing a grating may enhance first-order efficiency by as much as a factor of three or more. In FIG. 13 a blazing scheme is shown with the relevant parameters, and in FIG. 14 is a plot the ratios of the −1st, 0th, and 1st order intensities for a blazed versus an unblazed gold grating, for various blaze shapes and various soft X-ray energies.

Accordingly, blazing is a very suitable technique for maximizing the throughput of a transmission grating monochromator design.

Monochromator Configuration.

For a simple, single diffracting element, with a dispersion length L, a period a, and an output slit $\Delta\chi$, a good estimate of the resolution R may be obtained from the equation (for $\lambda/a$ small), $$\frac{1}{R} = \frac{\Delta\lambda}{\lambda} \cong \frac{\Delta\chi/L}{\lambda/a} \cong \frac{\Delta\theta}{\theta} \quad (18)$$

$$R \cong \frac{L\lambda}{\Delta\chi a} \quad (19)$$

Where $\theta$, the *dispersion* angle, stems from the diffraction relation, $\lambda = a \sin\theta$, for $\theta$ small.

Thus, it is seen that resolution can be improved with *smaller* slits, *longer* dispersion lengths, *smaller* grating periods, and resolution improved linearly with wavelength.

Given Equation (19), all the previous results, and a required range of operation of less than an octave (e.g. 100 eV-150 eV), and a narrow band source, it is preferable to design a monochromator with fixed entrance and exit slits and tune it by simply rotating the grating. Given a broadband input (such as a synchrotron source), however, the novel design indicated in FIG. 3 is more nearly optimal. The depicted monochromator can easily tune a decade and an octave without grating rotation or replacement, as the mirrors 24 and 26 can easily pick off the desired first orders. With higher density gratings the tuning range and resolution also clearly increase by the same factor. With a proper choice of grating at the input, the symmetric design also doubles the throughput of the instrument. The mirrors are intended to be composed of multilayer films, and such mirrors have already been proved to be highly efficient reflectors in the soft X-ray range. Given the availability of blazed gratings, only the top half (input grating—mirror 24—outputgrating) of the monochromator would be used, with the top mirror and the input and output gratings replaced by blazed gratings. Finally, by making the input and output gratings synchronously rotatable and by using only the top half of the monochromator, a fixed-efficiency output is obtained by utilizing the interference effect (Equation (6)). However, outstanding harmonic suppression could be achieved only by using four *fixed* gratings (as in FIG. 5) though the throughout of such a three-grating configuration is very low.

Given an independent focusing mirror (FIG. 4) that would overcome the broadening effects of the separate gratings, it is clear that the resolution of the two grating (and the three-grating) configurations are superior to that of a monochromator with only one diffracting element. Use of a preliminary independent mirror could also be avoided by appropriately bending the input and/or output gratings so that they develop the proper focussing properties.

The specific formula for the resolution of the two (or three) grating configuration (with a focusing mirror) will be similar to Equation (19), with the expression for the dispersion angle $\theta \cong \lambda/a$ replaced by $$\theta_{(2)} \cong \frac{\lambda}{a_1} + \frac{\lambda}{a_2} \quad (20)$$

or $$\theta_{(3)} \cong \frac{\lambda}{a_1} + \frac{\lambda}{a_2} + \frac{\lambda}{a_3} \quad (21)$$

where $a_1$, $a_2$, and $a_3$ are the periods of the input, output, and top (where $M_1$ is in FIG. 15) gratings. For gratings with the same periods, $$R\text{ (2 gratings)} \cong \frac{2L\lambda}{\Delta\chi a} \quad (22)$$

and $$R\text{ (3 gratings)} \cong \frac{4L\lambda}{\Delta\chi a} \quad (23)$$

However, if focusing transmission gratings become available, the mirror used to overcome the broadening introduced by the gratings would then become unnecessary.

Since the preferred design is quite long (11′) L is also very long, and thus the design (in the two-grating configuration) can have a potential resolution of (for $a=5,000$ Å, $\lambda=12$ Å, $\Delta\chi=1.5\times10^6$ Å) 1000 (0.012 Å) at 1,000 eV, a factor of 17 better than the current soft X-ray monochromators at SSRL. In the three-grating configuration, the resolution would be 34 times better.

An improved, tunable monochromator having increased first order throughput has been described. While the invention has been described with reference to specific embodiments, the description is illustrative of the invention and not limiting the invention. Various modifications and applications may occur to those skilled in the art without departing from the true spirit and scope of the invention as defined by the appended claims.

What is claimed is:

1. An X-ray monochromator comprising
   a housing,
   a radiation input port to said housing,
   a radiation output port from said housing,
   an input transmission grating positioned in said housing to receive radiation from said input port,
   deflection means within said housing for receiving radiation from said input grating,
   an output transmission grating positioned in said housing to receive radiation from said deflection means and direct said radiation to said radiation output port, and
   coupling means mechanically and moveably coupling said input grating, said deflection means, and said output grating for tuning said monochromator.

2. The monochromator as defined by claim 1 wherein said coupling means comprises a plurality of mechanical worms rotatably connecting said input grating, said deflection means, and said output grating.

3. The monochromator as defined by claim 2 wherein said coupling means includes a plunger member for moving said deflection means and tuning said monochromator.

4. The monochromator as defined by claim 2 wherein said input grating and said output grating are rotatable.

5. The monochromator as defined by claim 1, 2, 3, or 4 wherein said deflection means comprises at least one mirror.

6. The monochromator as defined in claim 1, 2, 3 or 4 wherein said deflection means comprises a pair of intermediate gratings.

7. The monochromator as defined by claim 1, 2, 3 or 4 wherein at least one of said input gratings and said output gratings is curved and provides focusing of radiation.

* * * * *